(12) United States Patent
Vesikivi et al.

(10) Patent No.: US 7,532,125 B2
(45) Date of Patent: May 12, 2009

(54) SYSTEM AND METHOD FOR WORKER SUPERVISION

(75) Inventors: Petri Vesikivi, Espoo (FI); Pekka K. Viitaniemi, Espoo (FI); Petri K. Vuorinen, Vantaa (FI); Ilkka Tiainen, Espoo (FI)

(73) Assignee: Nokia Corporation, Espoo (FI)

( * ) Notice: Subject to any disclaimer, the term of this patent is extended or adjusted under 35 U.S.C. 154(b) by 470 days.

(21) Appl. No.: 10/930,002

(22) Filed: Aug. 30, 2004

(65) Prior Publication Data

US 2006/0044141 A1 Mar. 2, 2006

(51) Int. Cl.
*G08B 23/00* (2006.01)

(52) U.S. Cl. ............... 340/573.1; 340/572.1; 348/143; 348/160; 348/14.01

(58) Field of Classification Search ... 340/572.1–572.9, 340/10.1–10.6; 235/375–385
See application file for complete search history.

(56) References Cited

U.S. PATENT DOCUMENTS

| | | | |
|---|---|---|---|
| 5,027,955 A * | 7/1991 | Shoemaker et al. | 211/40 |
| 5,120,942 A * | 6/1992 | Holland et al. | 235/376 |
| 6,424,264 B1 * | 7/2002 | Giraldin et al. | 340/573.1 |
| 6,747,562 B2 * | 6/2004 | Giraldin et al. | 340/573.1 |
| 6,928,468 B2 * | 8/2005 | Leermakers | 709/221 |
| 7,072,672 B1 | 7/2006 | Vanska et al. | |
| 7,185,807 B1 * | 3/2007 | Robinson et al. | 235/382 |
| 2002/0175211 A1 | 11/2002 | Dominquez et al. | |
| 2003/0043040 A1 * | 3/2003 | Zeps et al. | 340/573.1 |
| 2003/0197612 A1 | 10/2003 | Tanaka et al. | |
| 2003/0203730 A1 * | 10/2003 | Wan et al. | 455/404.2 |
| 2004/0011981 A1 | 1/2004 | Ahn | |
| 2004/0061646 A1 * | 4/2004 | Andrews et al. | 342/463 |
| 2005/0116811 A1 * | 6/2005 | Eros et al. | 340/5.82 |
| 2005/0210264 A1 | 9/2005 | Vesikivi et al. | |
| 2006/0208857 A1 * | 9/2006 | Wong | 340/5.82 |
| 2007/0043811 A1 * | 2/2007 | Kim et al. | 709/203 |

FOREIGN PATENT DOCUMENTS

| | | |
|---|---|---|
| DE | 10103266 | 4/2002 |
| DE | 10103266 A1 | 4/2002 |
| GB | 2 392 331 | 2/2004 |
| WO | WO 01/73687 A2 | 10/2001 |
| WO | WO 03/088156 A2 | 10/2003 |
| WO | WO03088156 | 10/2003 |
| WO | WO 2004/003801 A1 | 1/2004 |
| WO | WO 2004/025575 A1 | 3/2004 |
| WO | WO2004025575 | 3/2004 |

OTHER PUBLICATIONS

PCT International Search Report of PCT/IB2005/002535, Date of Completion—Jan. 23, 2006.
International Search Report of PCT/IB2005/002535—Date of Completion of Search: Jan. 23, 2006.

* cited by examiner

*Primary Examiner*—George A Bugg
*Assistant Examiner*—Samuel J Walk
(74) *Attorney, Agent, or Firm*—Locke Lord Bissell & Liddell, LLP (57) ABSTRACT

Systems and methods applicable, for instance, in the supervision of workers. A worker device may, for example, be employed to access a storage element associated with a workplace location, and/or a sensor may capture. The worker device might, for example, provide to another device dispatch including, for instance, sensor output and/or data read from the storage element.

120 Claims, 5 Drawing Sheets

SYSTEM AND METHOD FOR WORKER SUPERVISION

FIELD OF INVENTION

This invention relates to systems and methods for worker supervision.

BACKGROUND INFORMATION

In recent years, there has been an increase in the use of devices (e.g., wireless nodes and/or other computers) by workers. For example, various workers have been provided with devices that are carried with them as they work.

Accordingly, there may be interest in technologies that, for example, are applicable to such use of devices.

SUMMARY OF THE INVENTION

According to various embodiments of the present invention there are provided systems and methods applicable, for example, in the supervision of workers.

In various embodiments, a worker device may be employed to access a storage element associated with a workplace location, and/or a sensor may capture. The worker device might, in various embodiments, provide to another device dispatch including, for example, sensor output and/or data read from the storage element.

DETAILED DESCRIPTION OF THE INVENTION

General Operation

According to embodiments of the present invention there are provided systems and methods applicable, for example, in the supervision of workers.

For instance, a worker may carry a device as she performs her duties. In various embodiments, being at a workplace location and/or performing a task at that location, the worker might employ her device in accessing a storage element (e.g., a radio frequency identification (RFID) tag) associated with the workplace location.

In various embodiments, a sensor (e.g., a camera) integrated with and/or peripheral to the worker's device might capture. Accordingly, for instance, a photograph of the workplace location and/or a task performed there might be captured.

The worker's device might, in various embodiments, provide to another device (e.g., a server) dispatch including, for example, sensor output and/or data read from the storage element.

The dispatch might, perhaps, serve to evidence the worker having, for example, visited the workplace location and/or performed a task at the workplace location.

Various aspects of the present invention will now be discussed in greater detail.

Worker Device Operations

According to various embodiments of the present invention, storage elements may be installed at various workplace locations. Such storage elements might, for instance, be RFID tags, iButtons, barcodes, magnetic stripes, smartcards, flash memory, and/or wirelessly-accessible memory (e.g., memory accessible via Bluetooth, WiFi (e.g., 802.11g), and/or ultra wide band (UWB). Such workplace locations might, for example, include locations to be visited by a security guard, containers, tanks, and/or meters to be inspected by an inspector, locations to be cleaned by a cleaning person, and/or locations to be maintained by a repairperson.

A variety of data might be held by the placed storage elements. For example, data identifying the workplace location might be held. Such identifying data might, for instance be one or more unique values, and/or location specifications such as descriptions (e.g., "first floor lobby—north side") and/or geographical specifications (e.g., latitude-longitude specifications). As another example, the placed storage elements might hold status data for the workplace location. Such status data might, for instance, be readings corresponding to the location provided to the storage element by a gauge, indicator, and/or the like.

Figure 1:
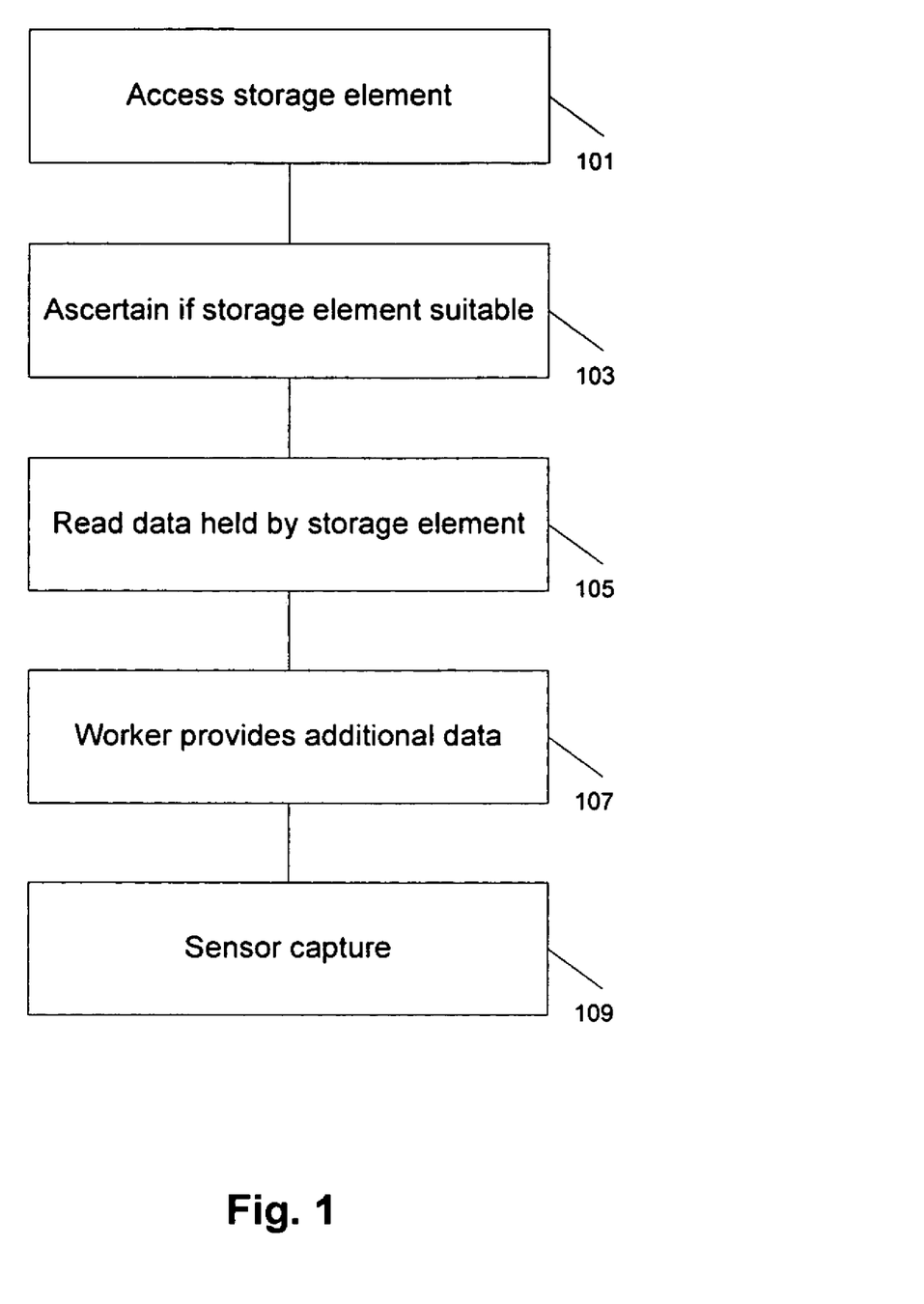
FIG. 1 shows exemplary steps involved in worker device operations according to various embodiments of the present invention.

With respect to FIG. 1 it is noted that, according to various embodiments, a worker's device (e.g., a wireless node and/or other computer) might, for example, act to access a storage element associated with a workplace location (step 101). The worker might, in various embodiments, act to request and/or approve such access. The access might, for example, occur with the worker's visitation of the location, and/or in conjunction with performance of a task at the location (e.g., before, during, and/or after performing the task).

The worker's device might, for instance, have at its disposal an appropriate interface for such access (e.g., an RFID interface in the case where the storage element is an RFID tag). The worker's device might, for example, include an integrated interface. As another example, the worker's device might communicate (e.g., via universal serial bus (USB), Firewire, Bluetooth, UWB, WiFi, and/or Ethernet) with a peripheral interface.

With access of a storage element at a workplace location, a number of operations may be performed. For example, action may be taken (e.g., by software operating on the worker's device) to ascertain if the storage element is a suitable storage element (step 103). For instance, one or more operations may be performed to confirm that the storage device is a service tag, that it is not counterfeit, and/or that it is not expired. As another example, perhaps after determining the storage element to be suitable, one or more operations might be performed to read some or all of the data held by the storage element (step 105).

As yet another example, the worker may be requested to, queried for, and/or provided with the opportunity to provide additional data (step 107). The worker might, for instance, be able to provide freeform remarks, comments, questions, and/or requests, be able to answer questions, and/or be able to fill out a form. Accordingly the worker's device might provide the worker with a graphical user interface (GUI) and/or other interface. In various embodiments, the worker might be able to employ such functionality to request assistance.

As still another example, the worker's device may act in having a sensor capture (step 109). Such a sensor might, for instance, be a camera, an audio sensor, a location sensor (e.g., a global positioning system (GPS) sensor), an accelerometer, temperature sensor, a pressure sensor, and/or an altimeter. Such a camera might, for instance, be a still camera and/or a motion camera. Moreover, such a camera might, for instance, be sensitive to the human-visible portion and/or other portions of the electromagnetic spectrum (e.g., a thermal or x-ray camera might be employed). In various embodiments, the worker's device might receive capture via more than one sensor.

It is noted that, in various embodiments, sensor capture may be coupled to storage element access. For example, in various embodiments sensor capture may be initiated in response to storage element access.

In various embodiments, action of the worker may be involved in sensor operation, (e.g., via a GUI and/or other interface provided by her device). For instance, a GUI and/or other interface provided by the worker's device might request that the worker aim the sensor and/or act to have the sensor capture (e.g., by pressing a virtual or actual button). In various embodiments, no action of the worker might be involved. Thus, the worker's device might automatically have a sensor capture (e.g., with storage element access). It is noted that, in various embodiments, the worker's device might, after it requested that the worker aim a sensor, automatically have the sensor capture.

The worker's device might, in various embodiments, specify (e.g., via a GUI other interface), an amount of time to the worker. For instance, the worker might be given an amount of time (e.g., 15 seconds) to aim a sensor (e.g., a camera). It might, for example, be the case that the worker's device would automatically have the sensor capture with the expiration of the amount of time. As another example, functionality might be such that, if the worker did not act to have the sensor capture before expiration of the amount of time, the worker's device would make a corresponding log entry, dispatch a corresponding message to an appropriate device (e.g., a server), dispatch a corresponding message to an appropriate user (e.g., a supervisor), and/or the like.

It is noted that, in various embodiments, a sensor might capture for a particular period of time (e.g., 30 seconds of capture). The period of time might, for instance, be set by a worker, a system administrator, and/or a manufacturer. It is further noted that, in various embodiments, sensor capture might not occur unless a read storage element was found to be suitable.

A sensor might, for example, be integrated into a worker's device. As another example, it might be peripheral to the worker's device, with the worker's device communicating with the sensor via, for instance, USB, Firewire, Bluetooth, UWB, WiFi, and/or Ethernet.

As an example of sensor employment, a sensor might be employed to capture various aspects of the workplace location. As another example of sensor employment, the sensor might alternately or additionally be employed to capture various aspects of a task performed at the workplace location. Accordingly, for instance, a camera might capture a picture of the workplace location and/or of a task performed there (e.g., a repair).

As further examples, sensor employment might serve to capture the ambient sound of a workplace location (e.g., the sound of a warehouse floor or the sound of a restaurant kitchen) and/or sound indicative of a task having been correctly completed at a workplace location (e.g., the sound of a properly-running motor to compressor).

As additional examples, sensor employment might serve to capture location, acceleration, temperature, pressure, and/or altitude corresponding to a workplace location and/or a task. It is noted that, in various embodiments, there may be multiple sensor captures. For instance, multiple pictures might be captured.

The worker's device might, for example, act to provide dispatch to another device (e.g., a server). Such might, for example, be done after sensor capture and/or in response to sensor capture. Provided to the other device via such dispatch might, for instance, be data read from the storage element, additional data provided by the worker, sensor capture (e.g., one or more pictures), one or more time stamps, and/or one or more identifiers corresponding to the worker.

The worker's device might act to provide such dispatch to the other device in a number of ways. For example, the worker's device might act to perform dispatch soon after all to be included in the dispatch was possessed by the worker's device. The worker's device might so act, for instance, in the case where additional data provided by the worker indicated that assistance was needed. As another example, a delay might occur between all to be included in the dispatch being possessed and performance of dispatch.

It is noted that, in various embodiments, the worker might be able to indicate (e.g., via GUI and/or other interface provided by her device) that dispatch be performed. It is further noted that, in various embodiments, dispatch from the worker's device to the other device might occur periodically (e.g., hourly). Such periodicity might, perhaps, be in accordance with specification provided by a worker, a system administrator, and/or a manufacturer.

It is additionally noted that, in various embodiments, various of that which is included in dispatch might be combined with and/or linked to sensor capture. For example, data read from a storage element, additional data provided by a worker, one or more time stamps, other capture, and/or one or more identifiers corresponding to the worker might be combined with and/or linked to sensor capture. In various embodiments, various of that which is included in dispatch might, for example, be superimposed over a captured picture.

Dispatch from the worker's device to the other device might, for instance, employ Simple Object Access Protocol (SOAP), Remote Method Invocation (RMI), and/or Java Messaging Service (JMS). It is further noted that dispatch from the worker's device to the other device might, for instance, employ Universal Mobile Telephone Service (UMTS), General Packet Radio Service (GPRS), Short Message Service (SMS), Multimedia Messaging Service (MMS), and/or Internet Protocol (IP).

A network address (e.g., an IP address) and/or an identifier (e.g., a phone number or email address) indicating a device to which a worker's device should send dispatch could, in various embodiments, be set in a number of ways. For example, such might be set by action of a worker, a system administrator, and/or a manufacturer. As another example, a worker's device might receive one or more such network addresses and/or identifiers when receiving software that allows the worker's device to perform various of the operations discussed herein. It is noted that, in various embodiments, the destination of a dispatch might be predefined.

It is noted that, in various embodiments, dispatch from the worker's device to the other device might be associated with a session established between the two devices. In various embodiments, a session established between the two devices might be set (e.g., by a worker, a system administrator, and/or a manufacturer) to endure for a particular period of time (e.g., the working day of a worker). It is further noted that, in various embodiments, a session between the two devices might be established in a manner according to pending U.S. application Ser. No. 10/802,414 "System and Method for Session Provision" (filed Mar. 16, 2004), incorporated herein by reference.

It is noted that, in various embodiments, dispatch from the worker's device to the other device and/or portions thereof (e.g., capture and/or data read from a storage element) might be offered as indication that a workplace location was visited and/or that a task was performed.

Dispatch Receipt Operations

Figure 2:
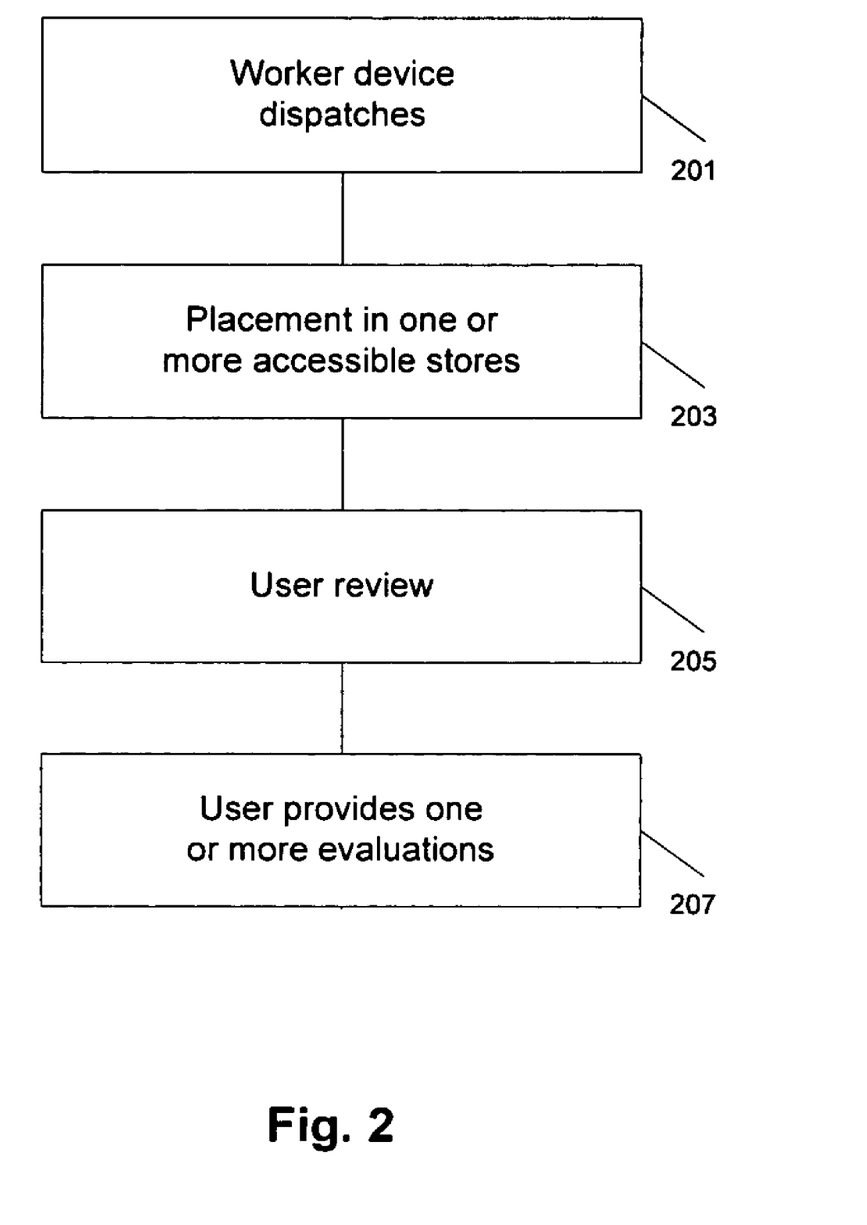
FIG. 2 shows exemplary steps involved in dispatch receipt operations according to various embodiments of the present invention.

With respect to FIG. 2 it is noted that, according to various embodiments, as indicated above a worker's device may act to dispatch to another device (e.g., a remote server and/or the like) (step 201). Such dispatch and/or portions thereof (e.g., capture and/or data read from a storage element) might, for instance, be capable of serving as evidence that a workplace location was visited and/or that a task was correctly completed.

The other device, receiving such dispatch might, for example, act to place into one or more accessible stores some or all of that which is included in the dispatch (step 203). The other device may, perhaps, have access to a store (e.g., a database) correlating various data held by storage elements with workplace locations. Accordingly, for example, such a store might correlate locations with unique values held by storage elements placed at workplace locations. The other device might, for instance, employ such a correlating store in the storage, correlation, and/or analysis of received dispatch. Accordingly, for example, the other device might act to correlate data received via dispatch with one or more workplace locations. It is noted that such a correlating store might, in various embodiments, be colocated with the other device.

The other device may, for example, provide functionality whereby a user (e.g., a supervisor) can perform review (e.g., via a GUI and/or other interface provided by the other device) with respect to some or all of that which is received via the dispatch. Accordingly, for example, such a user might be able to perform review with respect to data read from a storage element at a location, additional data supplied by a worker, and/or capture (step 205).

The user might, for example, examine capture to determine if a workplace location was actually visited by the worker. As another example, the user might examine capture to determine if a task was correctly completed. As another example, the user might examine data read from a workplace location storage element to determine if a workplace location was actually visited by the worker and/or if a task was correctly completed.

Such examination of capture might, for example, involve the user determining if a picture and/or sound corresponded to a particular workplace location and/or to correct completion of task. As another example, such examination of capture might involve the user determining if indication of location, pressure, and/or altitude corresponded to a particular workplace location and/or to correct completion of task.

The user might, perhaps, be able to provide to the other device (e.g., via a GUI and/or other interface provided by the other device) one or more evaluations that she had made via such review (step 207). For instance, the user might be able to indicate whether or not a workplace location was visited and/or whether or not a task was correctly completed.

It is noted that, in various embodiments, one or more operations might be automatically performed (e.g., by the other device) to evaluate dispatch. For example, one or more operations might be automatically performed whereby data read from a workplace location storage element is analyzed. As another example, one or more operations might be automatically performed whereby capture is analyzed.

Figure 3:
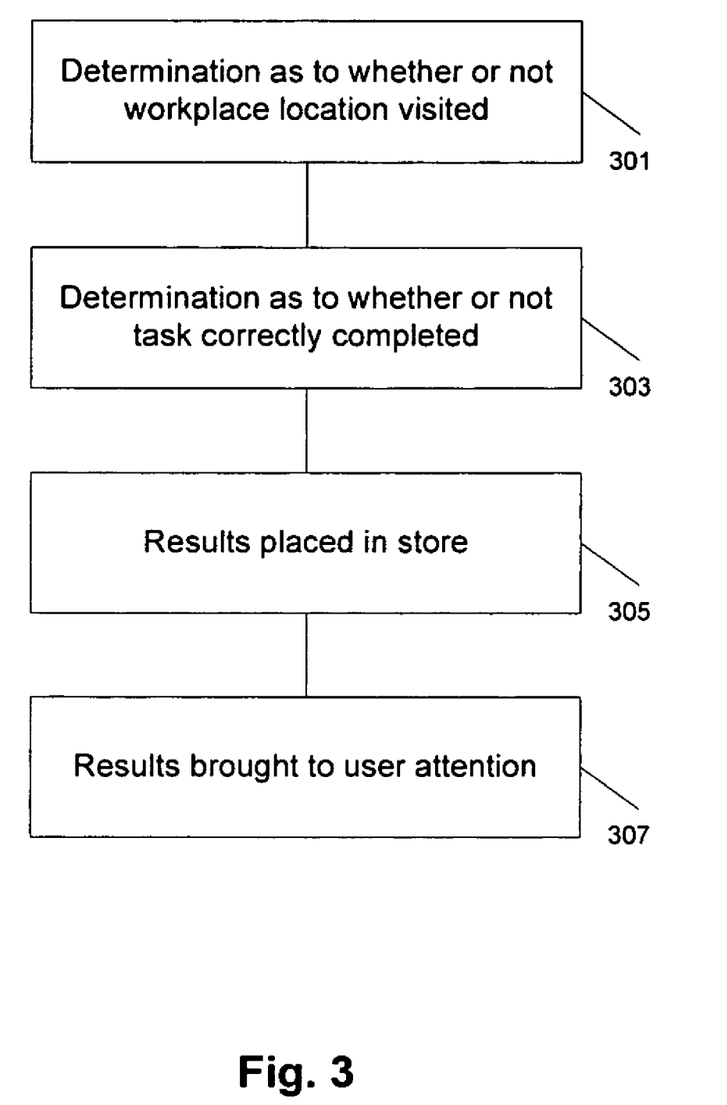
FIG. 3 shows further exemplary steps involved in dispatch receipt operations according to various embodiments of the present invention.

With respect to FIG. 3 it is noted that such analysis might, in various embodiments, act to make a determination as to whether or not a workplace location was visited (step 301) and/or whether or not a task was correctly completed (step 303). Results of such evaluation might, in various embodiments, be placed in an accessible store (step 305) and/or be brought to the attention of a user (e.g., a supervisor) (step 307).

Such analysis might, for example, involve data analysis, image analysis, sound analysis, location analysis, pressure analysis, and/or altitude analysis. As another example, such might involve comparison of dispatch content with held data. For example, received data read from a workplace location storage element, received pictures and/or sound, and/or indications of location, pressure, and/or altitude might be compared with accessible data, values, patterns, reference examples, and/or the like corresponding to various locations and/or to correct completion of various tasks.

For example, reference example pictures (e.g., including a reference example picture of a correctly installed window or a correct gear installation) and/or reference example sounds (e.g., including a reference example sound of a properly-running motor or compressor) for correctly completed tasks might be employed. As another example, reference example pictures (e.g., including a reference example picture of a warehouse floor or a lobby) and/or reference example sounds (e.g., including a reference example sound of a warehouse floor or a restaurant kitchen) representing various locations might be employed.

It is noted that, in various embodiments, the other device may provide to the worker's device software that allows the worker's device to perform various of the operations discussed herein (e.g., the worker's device initiating sensor capture and/or the worker's device providing dispatch to another device). The worker's device might, in various embodiments, receive such software at a time previous to performing various of the operations discussed herein. Dispatch of such software to the worker's node might, for example, be performed in a manner analogous to that discussed above.

Hardware and Software

Various operations and/or the like described herein may be executed by and/or with the help of computers. Further, for example, devices described herein may be and/or may incorporate computers. The phrases "computer", "general purpose computer", and the like, as used herein, refer but are not limited to a smart card, a media device, a personal computer, an engineering workstation, a PC, a Macintosh, a PDA, a portable computer, a computerized watch, a wired or wireless terminal, phone, node, and/or the like, a server, a network access point, a network multicast point, a set-top box, a personal video recorder (PVR), a game console, or the like, perhaps running an operating system such as OS X, Linux, Darwin, Windows CE, Windows XP, Windows Server 2003, Palm OS, Symbian OS, or the like, perhaps employing the Series 40 Platform, Series 60 Platform, and/or Series 90 Platform, and perhaps having support for Java and/or .Net.

Figure 4:
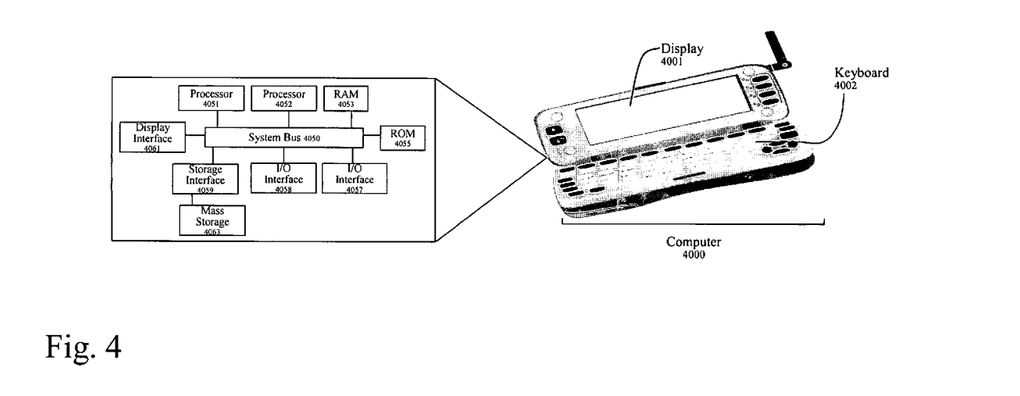
FIG. 4 shows an exemplary computer.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 4000 as shown in FIG. 4 includes system bus 4050 which operatively connects two processors 4051 and 4052, random access memory 4053, read-only memory 4055, input output (I/O) interfaces 4057 and 4058, storage interface 4059, and display interface 4061. Storage interface 4059 in turn connects to mass storage 4063. Each of I/O interfaces 4057 and 4058 may, for example, be an Ethernet, IEEE 1394, IEEE 1394b, IEEE 802.11a, IEEE 802.11b, IEEE 802.11g, IEEE 802.11i, IEEE 802.11e, IEEE 802.11n, IEEE 802.15a, IEEE 802.16a, IEEE 802.16d, IEEE 802.16e, IEEE 802.16x, IEEE 802.20, IEEE 802.15.3, ZigBee, Bluetooth, Wireless Universal Serial Bus (WUSB), wireless Firewire, terrestrial digital video broadcast (DVB-T), satellite digital video broadcast (DVB-S), Advanced Television Systems Committee (ATSC), Integrated Services Digital Broadcasting (ISDB), Digital Audio Broadcast (DAB), General Packet Radio Service (GPRS), Universal Mobile Telecommunications Service (UMTS), Global System for Mobile Communications (GSM), DVB-H (Digital Video Broadcasting: Handhelds), IrDA (Infrared Data Association), and/or other interface.

Mass storage 4063 may be a hard drive, optical drive, or the like. Processors 4051 and 4052 may each be a commonly known processor such as an IBM or Motorola PowerPC, an AMD Athlon, an AMD Opteron, an Intel ARM, an Intel XScale, a Transmeta Crusoe, a Transmeta Efficeon, an Intel Xenon, an Intel Itanium, or an Intel Pentium. Computer 4000 as shown in this example also includes a touch screen 4001 and a keyboard 4002. In various embodiments, a mouse, keypad, and/or interface might alternately or additionally be employed. Computer 4000 may additionally include or be attached to card readers, DVD drives, floppy disk drives, hard drives, memory cards, ROM, and/or the like whereby media containing program code (e.g., for performing various operations and/or the like described herein) may be inserted for the purpose of loading the code onto the computer.

In accordance with various embodiments of the present invention, a computer may run one or more software modules designed to perform one or more of the above-described operations. Such modules might, for example, be programmed using languages such as Java, Objective C, C, C#, C++, Perl, Python, and/or Xen according to methods known in the art. Corresponding program code might be placed on media such as, for example, DVD, CD-ROM, and/or floppy disk. It is noted that any described division of operations among particular software modules is for purposes of illustration, and that alternate divisions of operation may be employed. Accordingly, any operations discussed as being performed by one software module might instead be performed by a plurality of software modules. Similarly, any operations discussed as being performed by a plurality of modules might instead be performed by a single module. It is noted that operations disclosed as being performed by a particular computer might instead be performed by a plurality of computers. It is further noted that, in various embodiments, peer-to-peer and/or grid computing techniques may be employed.

Figure 5:
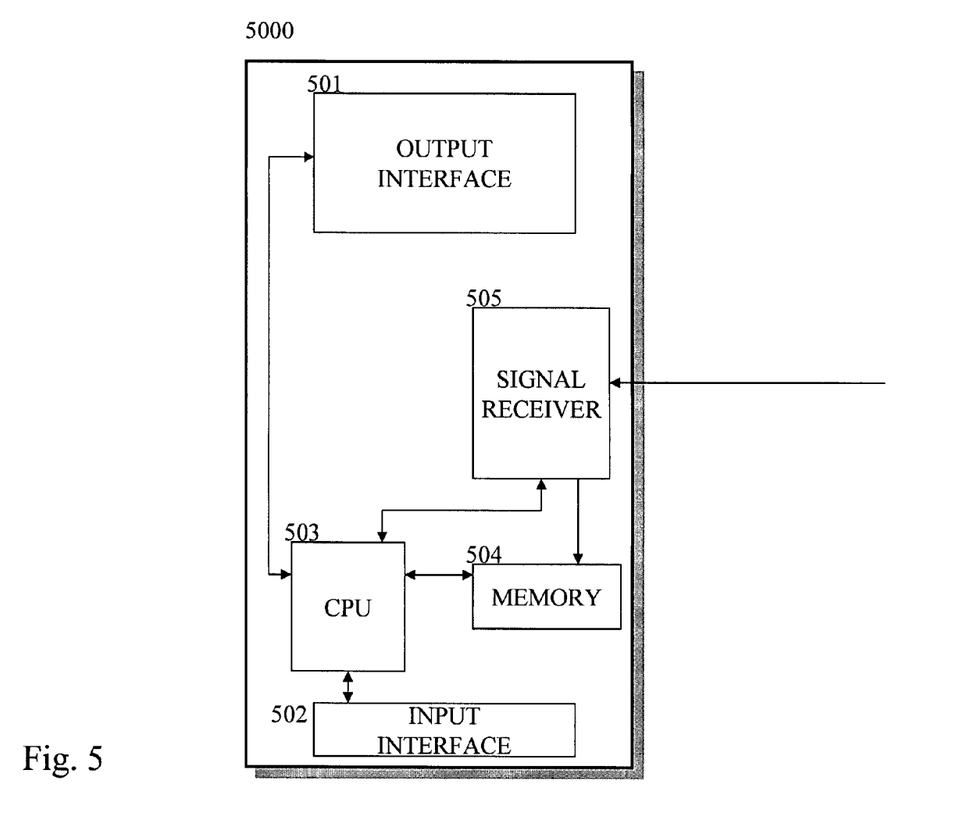
FIG. 5 shows a further exemplary computer.

Shown in FIG. 5 is a block diagram of a terminal, an exemplary computer employable in various embodiments of the present invention. In the following, corresponding reference signs are applied to corresponding parts. Exemplary terminal 5000 of FIG. 5 comprises a processing unit CPU 503, a signal receiver 505, and a user interface (501, 502). Signal receiver 505 may, for example, be a single-carrier or multi-carrier receiver. Signal receiver 505 and the user interface (501, 502) are coupled with the processing unit CPU 503. One or more direct memory access (DMA) channels may exist between multi-carrier signal terminal part 505 and memory 504. The user interface (501, 502) comprises a display and a keyboard to enable a user to use the terminal 5000. In addition, the user interface (501, 502) comprises a microphone and a speaker for receiving and producing audio signals. The user interface (501, 502) may also comprise voice recognition (not shown).

The processing unit CPU 503 comprises a microprocessor (not shown), memory 504 and possibly software. The software can be stored in the memory 504. The microprocessor controls, on the basis of the software, the operation of the terminal 5000, such as receiving of a data stream, tolerance of the impulse burst noise in data reception, displaying output in the user interface and the reading of inputs received from the user interface. The hardware contains circuitry for detecting signal, circuitry for demodulation, circuitry for detecting impulse, circuitry for blanking those samples of the symbol where significant amount of impulse noise is present, circuitry for calculating estimates, and circuitry for performing the corrections of the corrupted data.

Still referring to FIG. 5, alternatively, middleware or software implementation can be applied. The terminal 5000 can, for instance, be a hand-held device which a user can comfortably carry. The terminal 5000 can, for example, be a cellular mobile phone which comprises the multi-carrier signal terminal part 505 for receiving multicast transmission streams. Therefore, the terminal 5000 may possibly interact with the service providers.

Ramifications and Scope

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

In addition, the embodiments, features, methods, systems, and details of the invention that are described above in the application may be combined separately or in any combination to create or describe new embodiments of the invention.

What is claimed is:

1. A method, comprising:
receiving, at a node, data accessed from a storage element;
specifying, at the node in response to receiving the data from the storage element, via a user interface an amount of time for a user of the node to aim a sensor;
initiating, at the node, a capture from the sensor in response to expiration of the amount of time or detecting an action from the user of the node to have the sensor capture before the expiration of the amount of time; and
sending, from the node in response to the sensor capture, a dispatch to a remote destination,
wherein the dispatch includes the capture and at least a portion of the data received from the storage element.

2. The method of claim 1, wherein the dispatch provides evidence that a workplace location was visited by the user of the node.

3. The method of claim 1, wherein the capture included with the dispatch provides evidence that a task was performed at a workplace location.

4. The method of claim 1, wherein the sensor is a camera.

5. The method of claim 1, wherein the sensor is an audio sensor.

6. The method of claim 1, wherein the sensor is a global positioning system sensor.

7. The method of claim 1, wherein the sensor is an accelerometer.

8. The method of claim 1, wherein the sensor is a temperature sensor.

9. The method of claim 1, wherein the sensor is a pressure sensor.

10. The method of claim 1, wherein the sensor is an altimeter.

11. The method of claim 1, wherein the sensor captures for a particular period of time.

12. The method of claim 1, wherein the user of the node acts in operation of the sensor.

13. The method of claim 1, wherein the storage element is a radio frequency identification tag.

14. The method of claim 1, wherein the storage element is wirelessly-accessible memory.

15. The method of claim 1, further comprising recognizing the storage element as a service tag.

16. The method of claim 1, further comprising recognizing the storage element to be suitable.

17. The method of claim 1, further comprising:
receiving, at the node, additional data provided by the user of the node via a user interface of the node.

18. The method of claim 1, wherein a user interface for employment of the sensor is provided.

19. The method of claim 17, wherein the dispatch includes some or all of the additional data.

20. The method of claim 1, wherein the sensor is integrated into the node.

21. The method of claim 1, wherein the sensor is peripheral to the node.

22. The method of claim 1, wherein a storage element interface is integrated into the node.

23. The method of claim 1, wherein a storage element interface is peripheral to the node.

24. The method of claim 1, wherein the dispatch is sent to a remote server entity.

25. The method of claim 24, wherein dispatched storage element data is correlated with one or more workplace locations via a database at the remote server entity.

26. The method of claim 1, wherein the dispatch is associated with a session between the node and a remote server entity.

27. The method of claim 26, wherein the session endures for a working day of the user of the node.

28. The method of claim 1, wherein a destination of the dispatch is predefined.

29. The method of claim 1, further comprising:
receiving, at the node, software provided by a remote server entity,
wherein the software includes dispatch sending program code and sensor capturing initiation program code.

30. The method of claim 1, wherein the dispatch corresponds to a request for assistance.

31. The method of claim 1, wherein the dispatch includes a time stamp.

32. The method of claim 1, wherein the dispatch includes user identification.

33. The method of claim 1, wherein some or all of the dispatch is available to a supervisor.

34. The method of claim 1, wherein, in the dispatch, some or all of the data is linked to the capture.

35. The method of claim 1, wherein, in the dispatch, some or all of the data is combined with the capture.

36. A method, comprising:
receiving, at a server, a dispatch sent from a node,
wherein the node receives data accessed from a storage element,
wherein the node specifies, in response to receiving the data from the storage element, via a user interface an amount of time for a user of the node to aim a sensor,
wherein the node initiates a capture from the sensor in response to expiration of the amount of time or detecting an action from the user of the node to have the sensor capture before the expiration of the amount of time,
wherein the node sends the dispatch in response to the sensor capture,
wherein the dispatch includes the capture and at least a portion of the data received from the storage element.

37. The method of claim 36, wherein the dispatch provides evidence that a workplace location was visited by the user of the node.

38. The method of claim 36, wherein the capture included with the dispatch provides evidence that a task was performed at a workplace location.

39. The method of claim 36, wherein the sensor is a camera.

40. The method of claim 36, wherein the sensor is an audio sensor.

41. The method of claim 36, wherein the sensor is a global positioning system sensor.

42. The method of claim 36, wherein the sensor is an accelerometer.

43. The method of claim 36, wherein the sensor is a temperature sensor.

44. The method of claim 36, wherein the sensor is a pressure sensor.

45. The method of claim 36, wherein the sensor is an altimeter.

46. The method of claim 36, wherein the storage element is a radio frequency identification tag.

47. The method of claim 36, wherein the storage element is wirelessly-accessible memory.

48. The method of claim 36, wherein the node recognizes the storage element as a service tag.

49. The method of claim 36, wherein the dispatch is associated with a session between the node and the server.

50. The method of claim 49, wherein the session endures for a working day of the user of the node.

51. The method of claim 36, wherein the dispatch corresponds to a request for assistance.

52. The method of claim 36, wherein the dispatch includes a time stamp.

53. The method of claim 36, wherein the dispatch includes user identification.

54. The method of claim 36, wherein some or all of the dispatch is available to a supervisor.

55. The method of claim 36, wherein, in the dispatch, some or all of the data is linked to the capture.

56. The method of claim 36, wherein, in the dispatch, some or all of the data is combined with the capture.

57. The method of claim 36, further comprising:
sending, from the server to the node, software,
wherein the software includes dispatch sending program code and sensor capturing initiation program code.

58. A system, comprising:
a memory having program code stored therein; and
a processor disposed in communication with the memory for carrying out instructions in accordance with the stored program code;
wherein the program code, when executed by the processor, causes the processor to perform:
receiving, at a node, data accessed from a storage element;
specifying, at the node in response to receiving the data from the storage element, via a user interface an amount of time for a user of the node to aim a sensor;

initiating, at the node, a capture from the sensor in response to expiration of the amount of time or detecting an action from the user of the node to have the sensor capture before the expiration of the amount of time; and sending, from the node in response to the sensor capture, a dispatch to a remote destination, wherein the dispatch includes the capture and at least a portion of the data received from the storage element.

59. The system of claim 58, wherein the dispatch provides evidence that a workplace location was visited by the user of the node.

60. The system of claim 58, wherein the capture included with the dispatch provides evidence that a task was performed at a workplace location.

61. The system of claim 58, wherein the sensor is a camera.

62. The system of claim 58, wherein the sensor is an audio sensor.

63. The system of claim 58, wherein the sensor is a global positioning system sensor.

64. The system of claim 58, wherein the sensor is an accelerometer.

65. The system of claim 58, wherein the sensor is a temperature sensor.

66. The system of claim 58, wherein the sensor is a pressure sensor.

67. The system of claim 58, wherein the sensor is an altimeter.

68. The system of claim 58, wherein the sensor captures for a particular period of time.

69. The system of claim 58, wherein the user of the node acts in operation of the sensor.

70. The system of claim 58, wherein the storage element is a radio frequency identification tag.

71. The system of claim 58, wherein the storage element is wirelessly-accessible memory.

72. The system of claim 58, wherein the processor further performs recognizing the storage element as a service tag.

73. The system of claim 58, wherein the processor further performs recognizing the storage element to be suitable.

74. The system of claim 58, wherein the processor further performs:

receiving, at the node, additional data provided by the user of the node via a user interface of the node.

75. The system of claim 58, wherein a user interface for employment of the sensor is provided.

76. The system of claim 74, wherein the dispatch includes some or all of the additional data.

77. The system of claim 58, wherein the sensor is integrated into the node.

78. The system of claim 58, wherein the sensor is peripheral to the node.

79. The system of claim 58, wherein a storage element interface is integrated into the node.

80. The system of claim 58, wherein a storage element interface is peripheral to the node.

81. The system of claim 58, wherein the dispatch is sent to a remote server entity.

82. The system of claim 81, wherein dispatched storage element data is correlated with one or more workplace locations via a database at the remote server entity.

83. The system of claim 58, wherein the dispatch is associated with a session between the node and a remote server entity.

84. The system of claim 83, wherein the session endures for a working day of the user of the node.

85. The system of claim 58, wherein a destination of the dispatch is predefined.

86. The system of claim 58, wherein the processor further performs:

receiving, at the node, software provided by a remote server entity, wherein the software includes dispatch sending program code and sensor capturing initiation program code.

87. The system of claim 58, wherein the dispatch corresponds to a request for assistance.

88. The system of claim 58, wherein the dispatch includes a time stamp.

89. The system of claim 58, wherein the dispatch includes user identification.

90. The system of claim 58, wherein some or all of the dispatch is available to a supervisor.

91. The system of claim 58, wherein, in the dispatch, some or all of the data is linked to the capture.

92. The system of claim 58, wherein, in the dispatch, some or all of the data is combined with the capture.

93. A system, comprising:

a memory having program code stored therein; and a processor disposed in communication with the memory for carrying out instructions in accordance with the stored program code;

wherein the program code, when executed by the processor, causes the processor to perform:

receiving, at a server, a dispatch sent from a node, wherein the node receives data accessed from a storage element, wherein the node specifies, in response to receiving the data from the storage element, via a user interface an amount of time for a user of the node to aim a sensor, wherein the node initiates a capture from the sensor in response to expiration of the amount of time or detecting an action from the user of the node to have the sensor capture before the expiration of the amount of time, wherein the node sends the dispatch in response to the sensor capture, wherein the dispatch includes the capture and at least a portion of the data received from the storage element.

94. The system of claim 93, wherein the dispatch provides evidence that a workplace location was visited by the user of the node.

95. The system of claim 93, wherein the capture included with the dispatch provides evidence that a task was performed at a workplace location.

96. The system of claim 93, wherein the sensor is a camera.

97. The system of claim 93, wherein the sensor is an audio sensor.

98. The system of claim 93, wherein the sensor is a global positioning system sensor.

99. The system of claim 93, wherein the sensor is an accelerometer.

100. The system of claim 93, wherein the sensor is a temperature sensor.

101. The system of claim 93, wherein the sensor is a pressure sensor.

102. The system of claim 93, wherein the sensor is an altimeter.

103. The system of claim 93, wherein the storage element is a radio frequency identification tag.

104. The system of claim 93, wherein the storage element is wirelessly-accessible memory.

105. The system of claim 93, wherein the node recognizes the storage element as a service tag.

106. The system of claim 93, wherein the dispatch is associated with a session between the node and the server.

107. The system of claim 106, wherein the session endures for a working day of the user of the node.

108. The system of claim 93, wherein the dispatch corresponds to a request for assistance.

109. The system of claim 93, wherein the dispatch includes a time stamp.

110. The system of claim 93, wherein the dispatch includes user identification.

111. The system of claim 93, wherein some or all of the dispatch is available to a supervisor.

112. The system of claim 93, wherein, in the dispatch, some or all of the data is linked to the capture.

113. The system of claim 93, wherein, in the dispatch, some or all of the data is combined with the capture.

114. The system of claim 93, wherein the processor further performs:

sending, from the server to the node, software, wherein the software includes dispatch sending program code and sensor capturing initiation program code.

115. An article of manufacture comprising a computer readable medium containing program code that when executed causes a node to perform:

receiving, at the node, data accessed from a storage element;

specifying, at the node in response to receiving the data from the storage element, via a user interface an amount of time for a user of the node to aim a sensor;

initiating, at the node, a capture from the sensor in response to expiration of the amount of time or detecting an action from the user of the node to have the sensor capture before the expiration of the amount of time; and sending, from the node in response to the sensor capture, a dispatch to a remote destination, wherein the dispatch includes the capture and at least a portion of the data received from the storage element.

116. An article of manufacture comprising a computer readable medium containing program code that when executed causes a server to perform:

receiving, at the server, a dispatch sent from a node, wherein the node receives data accessed from a storage element, wherein the node specifies, in response to receiving the data from the storage element, via a user interface an amount of time for a user of the node to aim a sensor, wherein the node initiates a capture from the sensor in response to expiration of the amount of time or detecting an action from the user of the node to have the sensor capture before the expiration of the amount of time, wherein the node sends the dispatch in response to the sensor capture, wherein the dispatch includes the capture and at least a portion of the data received from the storage element.

117. The method of claim 1, further comprising:

performing at the node, where the user of the node fails to act in operation of the sensor before the expiration of the amount of time, one or more of making a log entry and dispatching a message.

118. The method of claim 36, wherein the node performs, where the user of the node fails to act in operation of the sensor before the expiration of the amount of time, one or more of making a log entry and dispatching a message.

119. The system of claim 58, wherein the processor further performs:

performing at the node, where the user of the node fails to act in operation of the sensor before the expiration of the amount of time, one or more of making a log entry and dispatching a message.

120. The system of claim 93, wherein the node performs, where the user of the node fails to act in operation of the sensor before the expiration of the amount of time, one or more of making a log entry and dispatching a message.

* * * * *